US011923591B2

(12) United States Patent
Dimitriades et al.

(10) Patent No.: US 11,923,591 B2
(45) Date of Patent: Mar. 5, 2024

(54) WAVEGUIDE DEVICE AND METHOD OF MANUFACTURING THIS DEVICE

(71) Applicant: SWISSto12 SA, Renens (CH)

(72) Inventors: Alexandre Dimitriades, Nyon (CH); Mathieu Billod, Présilly (FR); Lionel Simon, Lausanne (CH); Santiago Capdevila Cascante, Renens (CH); Emile de Rijk, Grand-Saconnex (CH)

(73) Assignee: SWISSTO12 SA, Renens (CH)

( * ) Notice: Subject to any disclaimer, the term of this patent is extended or adjusted under 35 U.S.C. 154(b) by 337 days.

(21) Appl. No.: 17/602,029

(22) PCT Filed: Apr. 10, 2020

(86) PCT No.: PCT/IB2020/053434
§ 371 (c)(1),
(2) Date: Oct. 7, 2021

(87) PCT Pub. No.: WO2020/208595
PCT Pub. Date: Oct. 15, 2020

(65) Prior Publication Data
US 2022/0149502 A1     May 12, 2022

(30) Foreign Application Priority Data
Apr. 11, 2019   (FR) .................................... 1903906

(51) Int. Cl.
*H01P 3/127*     (2006.01)
*B33Y 10/00*     (2015.01)
(Continued)

(52) U.S. Cl.
CPC .............. *H01P 3/127* (2013.01); *B33Y 10/00* (2014.12); *B33Y 80/00* (2014.12); *H01P 11/002* (2013.01)

(58) Field of Classification Search
CPC .. H01P 3/127; H01P 3/12; H01P 3/121; H01P 3/122; H01P 3/123; H01P 3/14;
(Continued)

(56) References Cited

U.S. PATENT DOCUMENTS

| 6,052,044 A | 4/2000 | Aves |
| 2012/0084968 A1 | 4/2012 | Nath et al. |
| 2015/0295297 A1 | 10/2015 | Cook et al. |

FOREIGN PATENT DOCUMENTS

| EP | 0189963 A2 | 8/1986 |
| GB | 1036749 A | 7/1966 |

(Continued)

OTHER PUBLICATIONS

International Search Report for PCT/IB2020/053434 dated Jul. 14, 2020.
Written Opinion for PCT/IB2020/053434 dated Jul. 14, 2020.

*Primary Examiner* — Stephen E. Jones
(74) *Attorney, Agent, or Firm* — Pearne & Gordon LLP

(57) ABSTRACT

Waveguide device for guiding a radio frequency signal at a given frequency f, the device including: a core manufactured by additive manufacturing and including side walls with inner and outer surfaces, the inner surfaces delimiting a waveguide channel, wherein a cross-section of the channel has two straight sides joined together by two half-portions, at least one of the two half-portions being rounded or formed of at least two straight segments, the cross-section having a maximum length (a) and a maximum width (b), the ratio between the maximum length (a)/maximum width (b) being between 2.05 and 3.5, preferably between 2.05 and 2.4.

18 Claims, 11 Drawing Sheets

(51) Int. Cl.
*B33Y 80/00* (2015.01)
*H01P 11/00* (2006.01)

(58) Field of Classification Search
CPC .... H01P 3/00; H01P 1/02; H01P 1/207; H01P 1/222; H01P 11/002; B33Y 10/00; B33Y 80/00

See application file for complete search history.

(56) References Cited

FOREIGN PATENT DOCUMENTS

| | | |
|---|---|---|
| WO | 2017149423 A1 | 9/2017 |
| WO | 2017203568 A1 | 11/2017 |
| WO | 2017208153 A1 | 12/2017 |

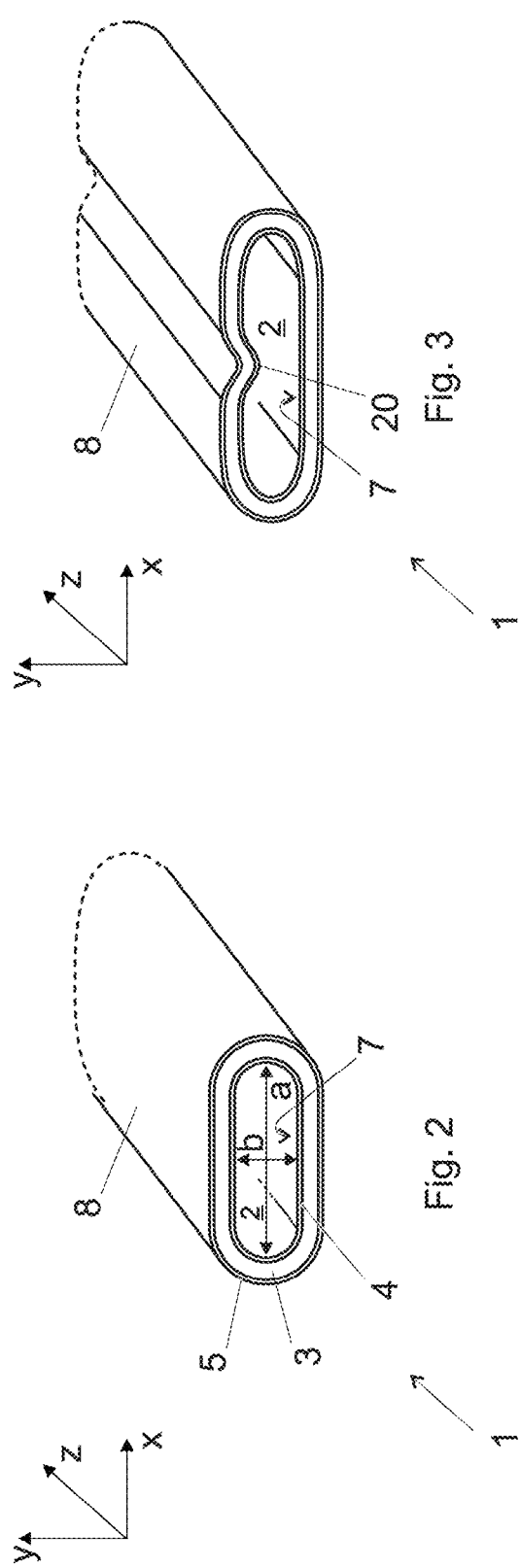

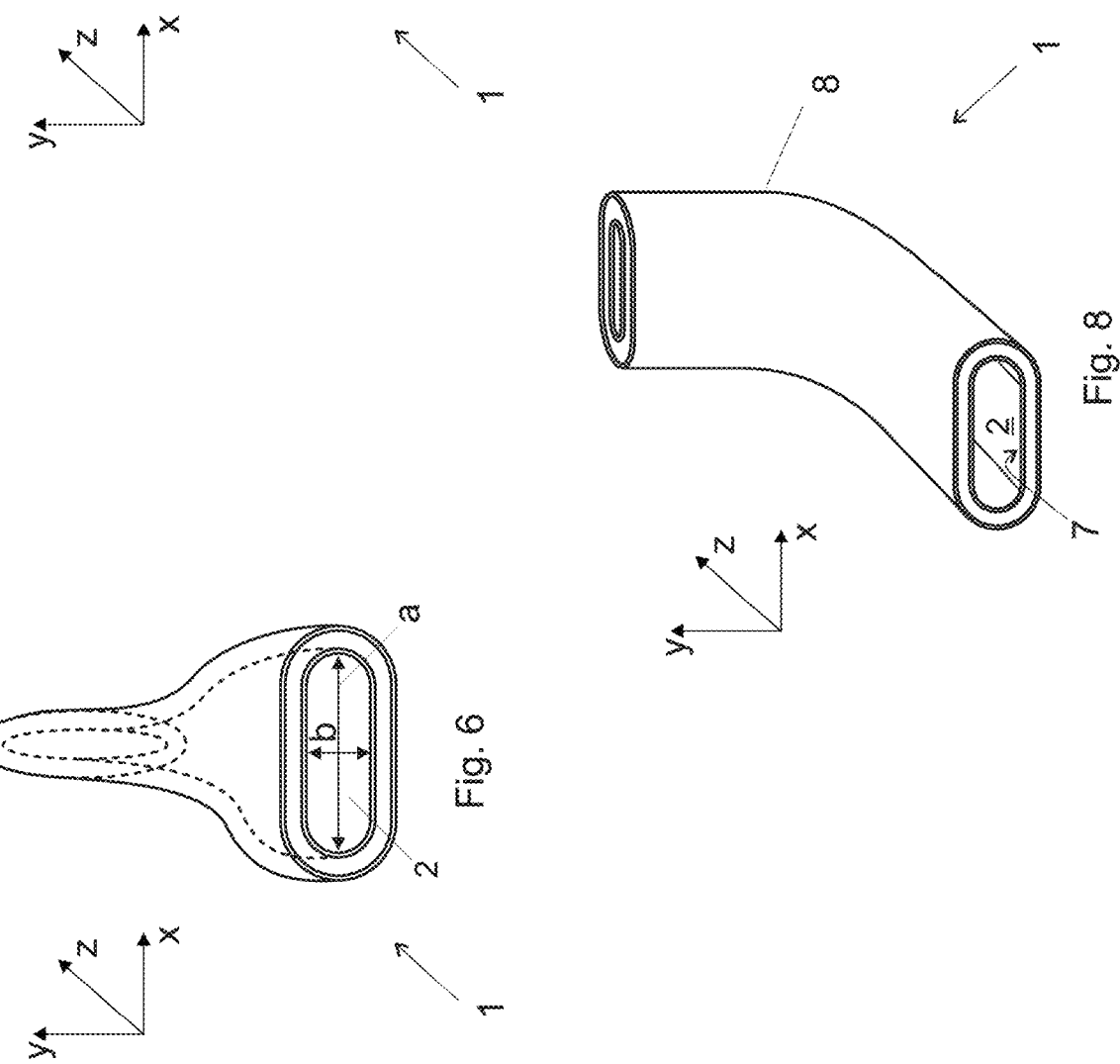

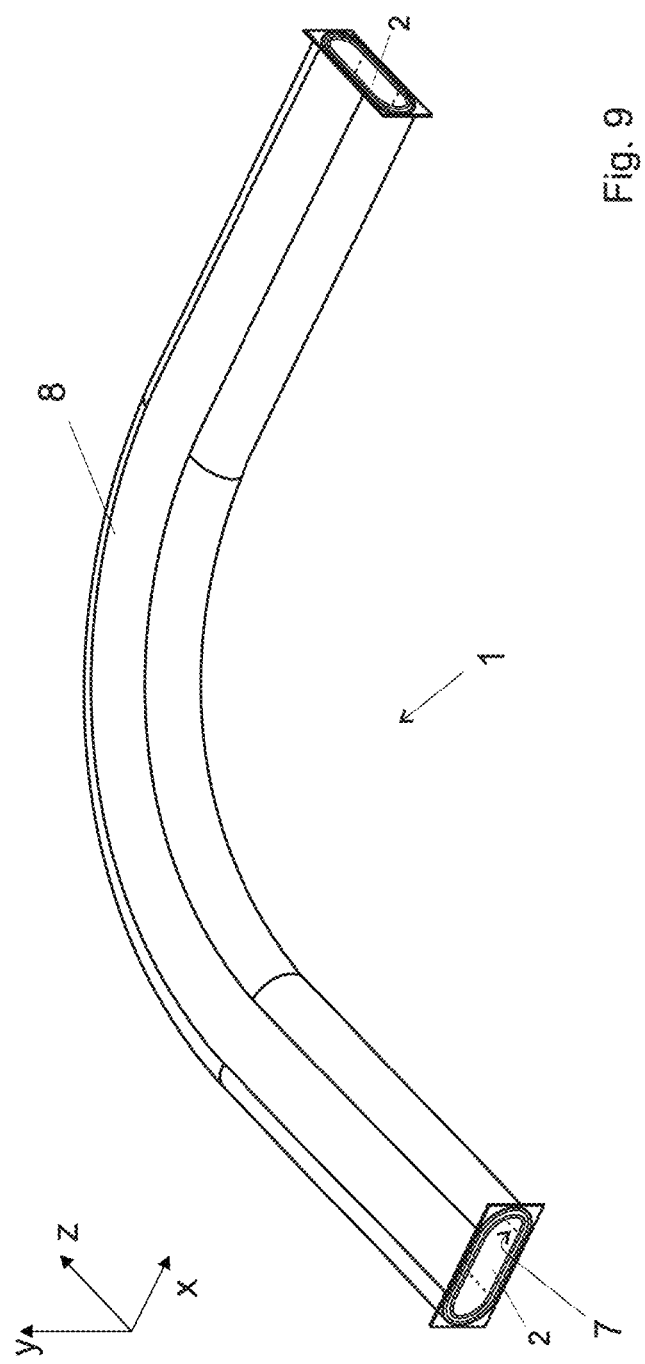

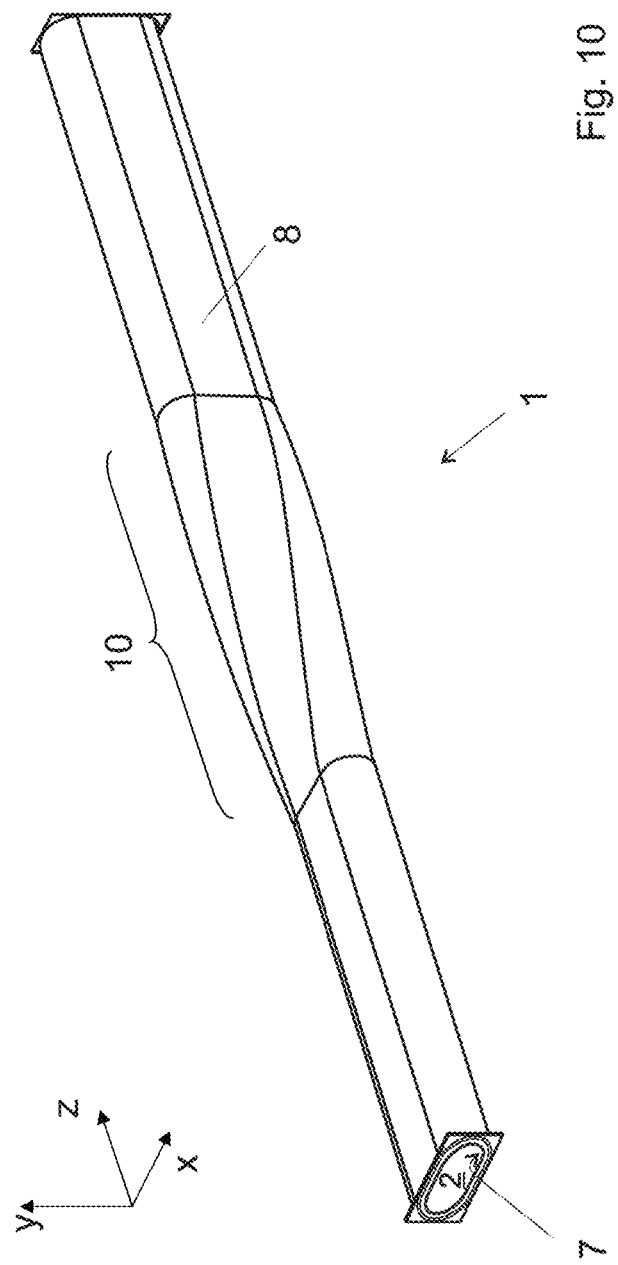

WAVEGUIDE DEVICE AND METHOD OF MANUFACTURING THIS DEVICE

TECHNICAL FIELD

The present invention relates to a waveguide device and a method of manufacturing said device.

BACKGROUND

Radio frequency (RF) signals can propagate either in free space or in waveguide devices. These waveguide devices are used to channel RF signals or to manipulate them in the spatial or frequency domain.

The present invention relates in particular to passive RF devices that allow the propagation and manipulation of radio frequency signals without the use of active electronics. Passive waveguides can be divided into three distinct categories:
- Devices based on guiding waves inside hollow metal channels, commonly called waveguides.
- Devices based on guiding waves inside dielectric substrates.
- Devices based on guiding waves by means of surface waves on metallic substrates such as PCBs, microstrips, etc.

The present invention relates particularly to the first category above, collectively referred to hereinafter as waveguides. Examples of such devices include waveguides per se, filters, antennas, polarizers, mode converters, etc. They can be used for signal routing, frequency filtering, signal separation or recombination, transmission or reception of signals into or from free space, etc.

Conventional waveguides used for radio frequency signals have internal openings of rectangular or circular cross-section. They allow the propagation of electromagnetic modes corresponding to different electromagnetic field distributions along their cross-section.

An example of such a conventional waveguide is shown in FIG. 1 from patent application WO2017208153. It consists of a hollow device, whose shape and proportions determine the propagation characteristics for a given wavelength of the electromagnetic signal. The cross-section of the internal channel of this device is rectangular. Other channel cross-sections are suggested herein, including circular shapes.

The waveguide 1 of FIG. 1 includes a core 3 made by additive manufacturing by superimposing layers on top of each other. This core 3 delimits an internal channel 2 intended for wave guidance, the cross-section of which is determined according to the frequency of the electromagnetic signal to be transmitted. The core 3 has an inner surface 7 and an outer surface 8, with the inner surface 7 covering the walls of the rectangular opening 2. The inner surface 7 of the core 3 is covered with a conductive metal layer 4. The outer surface 8 can also be covered with a conductive metal layer 5, which contributes in particular to the rigidity of the device.

Straight waveguides as in FIG. 1 are often printed with successive layers perpendicular to the longitudinal z direction, i.e., in a vertical position. This allows lateral surfaces of the guide to be printed in a vertical position and thus avoids the additive printing of cantilevered portions that are difficult or even impossible to achieve.

However, waveguides are often curved in order, for example, to connect equipment or devices that are not aligned with each other. Waveguides with bifurcations, e.g., polarizers, or changes in cross-sectional shape or area, e.g., in order to realize filters or other components, are also known. The additive manufacturing of such curved or non-rectilinear shaped waveguides, however, poses additional difficulties, as portions of the waveguide core are then necessarily cantilevered during printing.

FIG. 12 illustrates a portion of a rectangular waveguide core 3 during its additive printing on a horizontal platform 6. The longitudinal z direction of the waveguide is in this example substantially horizontal, but none of the side surfaces of the waveguide are horizontal. This results in additive layers 30 for printing the core that are not parallel to the sides of the waveguide and furthermore form an angle, for example an angle $\alpha 1$, with the horizontal surface xy of the printing platform. Most additive printing processes, however, including selective laser melting (SLM) processes, require a minimum angle, for example 20 or 40°, to avoid the risk of collapsing of a newly deposited cantilevered layer. This makes it impossible to print certain waveguide portions, or at least to print them with the desired precision.

FIG. 13 schematically illustrates the angle $\alpha 2$ that is formed between the additive print layers 30 of a waveguide portion whose longitudinal z axis is oblique to the x-y plane of the print platform 6.

BRIEF SUMMARY OF THE INVENTION

An aim of the present invention is to provide waveguide devices comprising a core made by additive printing that are simpler to manufacture.

An aim of the present invention is to provide waveguide devices comprising a core made by additive printing that are more robust.

Another aim of the present invention is to provide waveguide devices that can be directly connected to various types of equipment or other waveguide devices.

According to the invention, these aims are achieved in particular by means of a waveguide device for guiding a radio frequency signal at a determined frequency, comprising:
a core manufactured by additive manufacturing and comprising side walls with outer and inner surfaces, the inner surfaces delimiting a waveguide channel,
a cross-section of the channel having two straight sides joined together by two half-portions, at least one of the two half-portions being rounded or formed of at least two straight segments
said cross-section having a maximum length and a maximum width, the ratio between the maximum length/maximum width being between 2.05 and 3.5, preferably between 2.05 and 2.4.

The two straight sides facilitate 3D printing, especially when the waveguide is printed with these sections in a vertical, or near vertical, position, thereby reducing or even avoiding cantilever problems between a print layer and the overlying layer.

The maximum length preferably extends in a direction parallel to the two straight sides. The two straight sides preferably form the long sides of the section.

The rounded shape or shaped of at least two straight line segments of the half-portions functions as a pair of arches connecting the two rectilinear sides to each other, which also facilitates 3D printing by reducing cantilever problems, and on the other hand increases the stability and strength of the device during and after 3D printing.

The rounded shape of the short sides of the waveguide limits the length of the cantilever and thus reduces the risk of sagging, or the magnitude of sagging if it does occur.

This shape also improves the performance of the waveguide by reducing the attenuation per meter.

In general, the shape of this section has the advantage of facilitating the 3D printing of waveguides or waveguide portions, particularly with rectilinear portions that are vertical, close to the vertical, and even in any orientation with respect to the horizontal.

The term half-portion refers to any curve or open shape that connects the end of one of the straight sides to the other end.

The cross section of the channel is preferably oval in shape.

It can be shown that, in a rectangular waveguide according to FIG. 1, the portion of the electric field that is linearly polarized along the y-axis parallel to the length has the expression:

$$\vec{E} = E_{0y} \sin\left(\frac{m\pi}{a}x\right)e^{j(kz-\omega t)}\vec{u}_y, m \in \mathbb{N}^*$$

The portion of the electric field in the waveguide that is linearly polarized along the x-axis parallel to the width b obeys the same expression, replacing a by b and x by y.

The electric field thus undergoes an attenuation in z along the waveguide. It can be determined that the minimum attenuation is obtained when the ratio between the length a and the width b of the channel is exactly 2. This ratio also favors the filtering of unwanted transmission modes. For this reason, waveguides with a rectangular cross-section generally have a ratio of a/b that is exactly 2.

It has been demonstrated within the scope of the invention that waveguides with the described and claimed shape have minimum attenuation when the a/b ratio is between 2.05 and 3.5, preferably between 2.05 and 2.4, in particular for a value between 2.1 and 2.3, for example 2.2. These values are particularly optimal for waveguides with an oval cross-section.

Another advantage of this channel geometry is that it reduces the area of the inner and outer surfaces of the core, and thus the area that must be covered with a deposit.

The half portions may be rounded.

The rounded half portions may form half circles.

The term oval is used in this text to refer to any closed shape without sharp corners and concave portions, with the possible exception of ridges or septums. The term oval refers in particular to non-circular, preferably non-elliptical, closed shapes with two axes of symmetry (with the possible exception of ridges or septums).

The cross-section may have two long straight sides connected by two semicircles.

The inner face of the channel may be provided with a ridge.

The inner face of the channel may have two ridges opposite each other.

The cross-section may progressively evolve from a so-called oval cross-section in the middle of the device to a rectangular cross-section at at least one end of the device. This allows, for example, the cross-section to be adapted to a waveguide or waveguide connector of another device, without the need for intermediate adapting parts.

The device may be twisted by progressively rotating said cross-section along at least a portion of the device.

The device may be twisted by progressive rotation of the cross-section about the longitudinal axis of the device along at least a portion of the device.

The device may be twisted by progressive rotation of said cross-section simultaneously about the longitudinal axis and at least one other axis of the device along at least a portion of the device.

The device may be curved by progressive rotation of the cross-section about a transverse axis parallel to a straight side of the device along at least a portion of the device. This enables notably to modify the direction of signal transmission.

The device can be curved by progressive rotation of the cross-section about a transverse axis perpendicular to a straight side of the device along at least a portion of the device. This enables notably to modify the direction of signal transmission.

The device may include a conductive layer covering the core, said conductive layer being formed of a metal. This layer allows to make the surfaces of the waveguide conductive, and to smooth the surfaces of the core made by 3D printing.

The device may have at least one axis of symmetry and may be made by 3D printing of the device by forming multiple layers on a printing platform, the layers not being parallel to any plane of symmetry.

The invention also relates to a method of manufacturing a waveguide device as described or claimed, comprising a step of additive manufacturing of the core and a step of depositing a conductive layer on this core wherein the additive manufacturing is obtained by adding successive layers parallel to each other, said layers being non-parallel to said rectilinear sides of the cross-section of the device.

This additive manufacturing by layers oblique to at least one rectilinear portion of the device cross-section provides great freedom for the additive manufacturing of waveguides having portions oriented in any manner with respect to the plane of the printing platform.

For example, it is possible to print waveguide devices having cross-sections parallel or perpendicular to the printing plane of the layers, and at least one other cross-section not parallel to that plane.

The shape of the cross-section as described reduces the magnitude and consequences of cantilevers in this printing.

Preferably, only the straight sides should be sufficiently vertical during printing. In an embodiment, the angle between the printing layers and the straight sides is therefore greater than 20°, preferably greater than 40°.

BRIEF DESCRIPTION OF THE FIGURES

Examples of embodiments of the invention are shown in the description illustrated by the appended Figures in which:

FIG. 2 illustrates a waveguide portion of oval cross-section according to an embodiment.

FIG. 3 illustrates a waveguide portion of oval cross-section with a longitudinal ridge according to an embodiment.

FIG. 4 illustrates a waveguide portion of oval cross-section with two longitudinal ridges according to an embodiment.

FIG. 6 illustrates a waveguide portion of oval cross-section twisted about an axis according to an embodiment of the invention.

FIG. 7 illustrates a waveguide portion of oval cross-section twisted about two axes according to an embodiment of the invention.

FIG. 8 illustrates a waveguide portion of twisted and curved oval cross-section according to an embodiment of the invention.

FIG. 9 schematically illustrates the direction of printing of the core of a waveguide portion according to different embodiments of the invention.

FIG. 10 illustrates a waveguide portion whose midsection is twisted.

EXAMPLES OF EMBODIMENTS OF THE INVENTION

Figure 1:
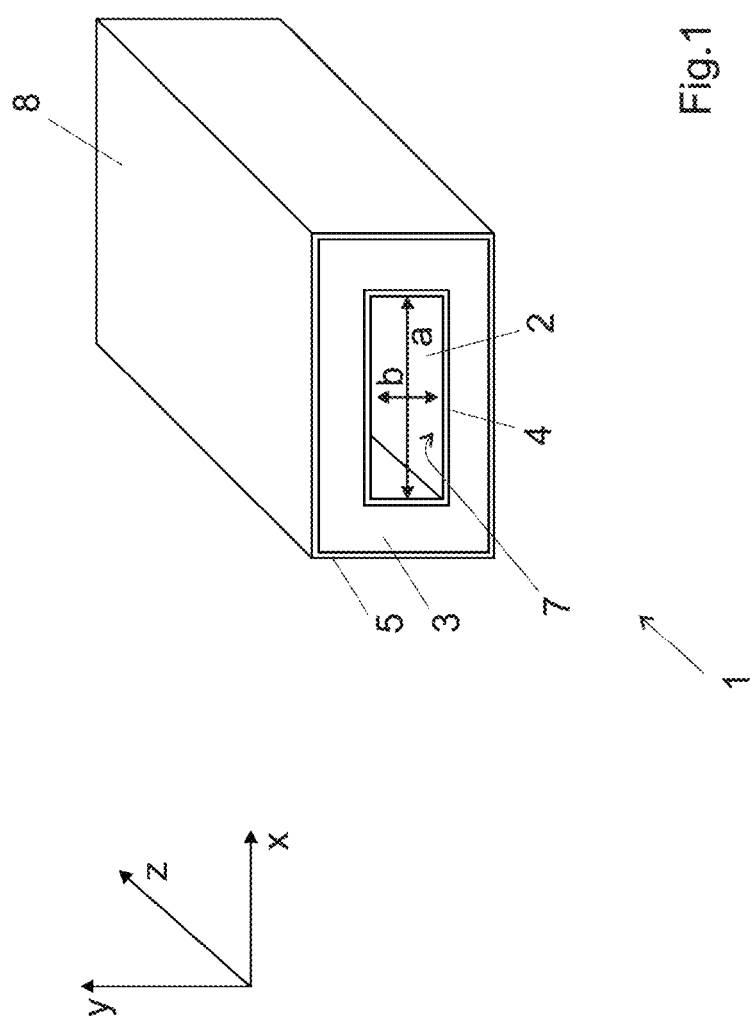
FIG. 1 illustrates a waveguide portion according to the prior art.

The waveguide 1 of the various described or claimed embodiments, for example that of FIG. 2, comprises a core 3, for example a core made of metal (aluminum, titanium or steel), or of polymer, epoxy, ceramic, or organic material.

The core 3 is manufactured by additive manufacturing, preferably by stereolithography, selective laser melting or selective laser sintering (SLS) in order to reduce surface roughness. The core material can be non-conductive or conductive. The wall thickness of the core is for example between 0.5 and 3 mm, preferably between 0.8 and 1.5 mm.

The shape of the core may be determined by a computer file stored in a computer data medium.

The core can also be made up of several parts formed by 3D printing and assembled together before plating, for example by gluing or thermal fusion or mechanical assembly.

This core 3 defines an internal channel 2 for guiding waves. The core 3 therefore has an inner surface 7 and an outer surface 8, the inner surface 7 covering the walls of the oval cross-section opening 2.

The inner surface 7 of the core 3 is preferably covered with a conductive metal layer 4, e.g. copper, silver, gold, nickel etc., plated by electroless plating. The thickness of this layer is for example between 1 and 20 micrometers, for example between 4 and 10 micrometers. The coating may also be an assembly of layers and comprise, for example, a smoothing layer directly on the core, one or more bonding layers, etc.

The thickness of the conductive coating 4 must be sufficient for the surface to be electrically conductive at the chosen radio frequency. This is typically achieved with a conductive layer whose thickness is greater than the skin depth 6.

The outer surface 8 of the channel is preferably also covered with a metallic layer that notably enables to stiffen the device, and to give it the required strength.

The waveguide channel may include a septum not shown to act as a polarizer to separate the two orthogonal polarities of a signal. The height of the septum may be variable, for example with stair steps.

In any embodiment, the waveguide channel may additionally be ridged, as discussed below.

At least one end of the waveguide may include a flange or flanges not shown to connect it to another waveguide device or equipment.

The waveguide is, for example, intended for use in a satellite to connect communications equipment, such as a radio frequency transmitter or receiver, to an antenna or antenna array. One end of the waveguide may be shaped as an antenna.

The shape and proportions of the cross-section of this channel is determined according to the frequency of the electromagnetic signal to be transmitted and according to the attenuations of different transmission modes.

In the embodiment shown in FIG. 2, the cross-section of the channel 2 through the waveguide is oval and has two parallel straight portions and two rounded short sides. The maximum length a of the channel in the x direction is equal to a and the maximum width of the channel in the y direction, i.e., between the straight sides, is equal to b.

The ratio of the maximum length a of the channel to its maximum width b in a conventional waveguide with a rectangular cross-section is typically 2. This value has been determined empirically to be the value that produces the lowest attenuation per linear meter.

According to the invention, it has been determined by tests and simulations that in the case of a waveguide channel having the oval shape as described, the ratio between the maximum length a of the channel and its maximum width b is greater than 2, preferably between 2.05 and 2.4, for example between 2.1 and 2.3, preferably 2.2.

Figure 11:
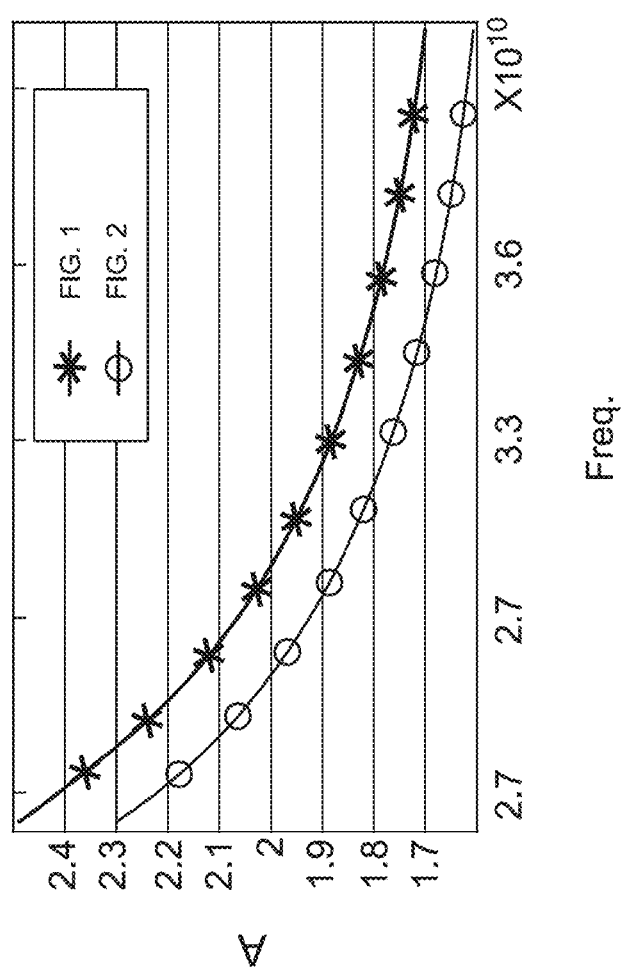
FIG. 11 is a measurement diagram comparing the linear attenuation of a conventional waveguide of rectangular cross-section and with a length-to-width ratio equal to 2, with that of an oval cross-section waveguide according to the invention and a length-to-width ratio equal to 2.
Figure 12:
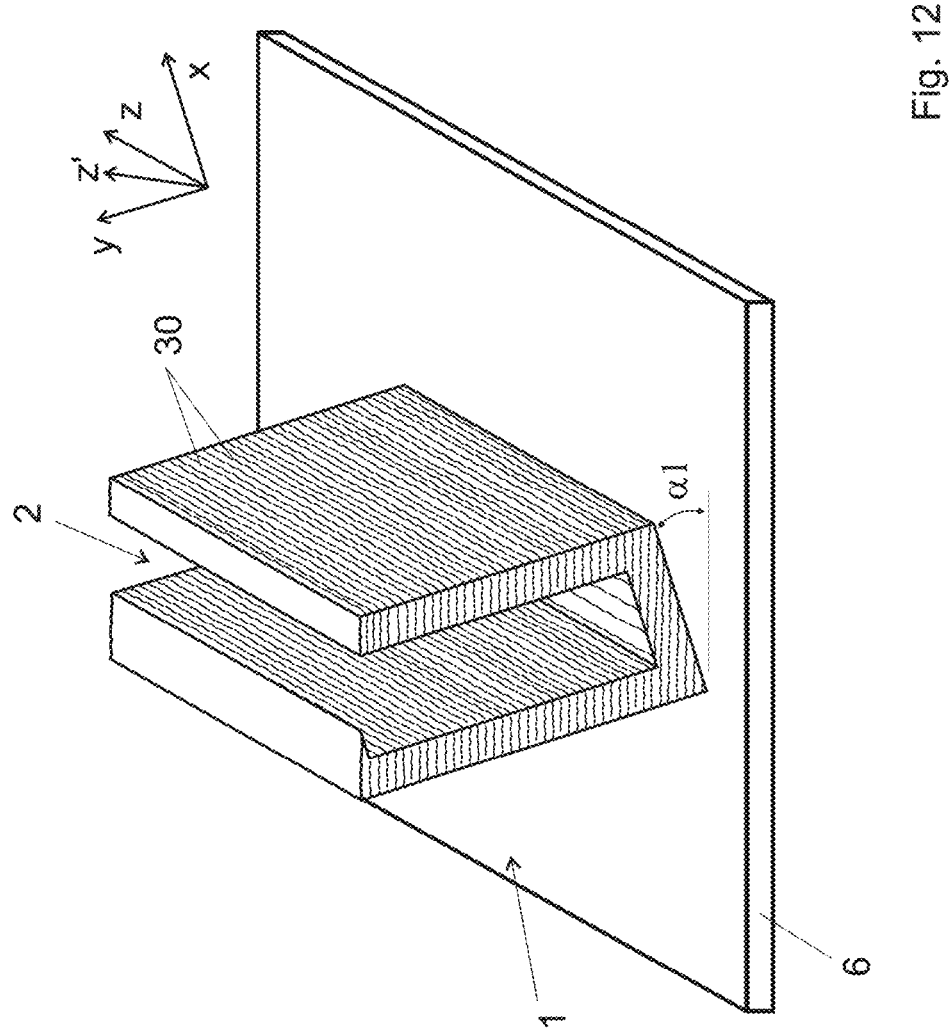
FIG. 12 schematically illustrates the 3D printing of a waveguide with a rectangular cross-section, the printing being performed in a lying position with printing planes oblique to some sides of the cross-section, resulting in problematic cantilevered sections.
Figure 13:
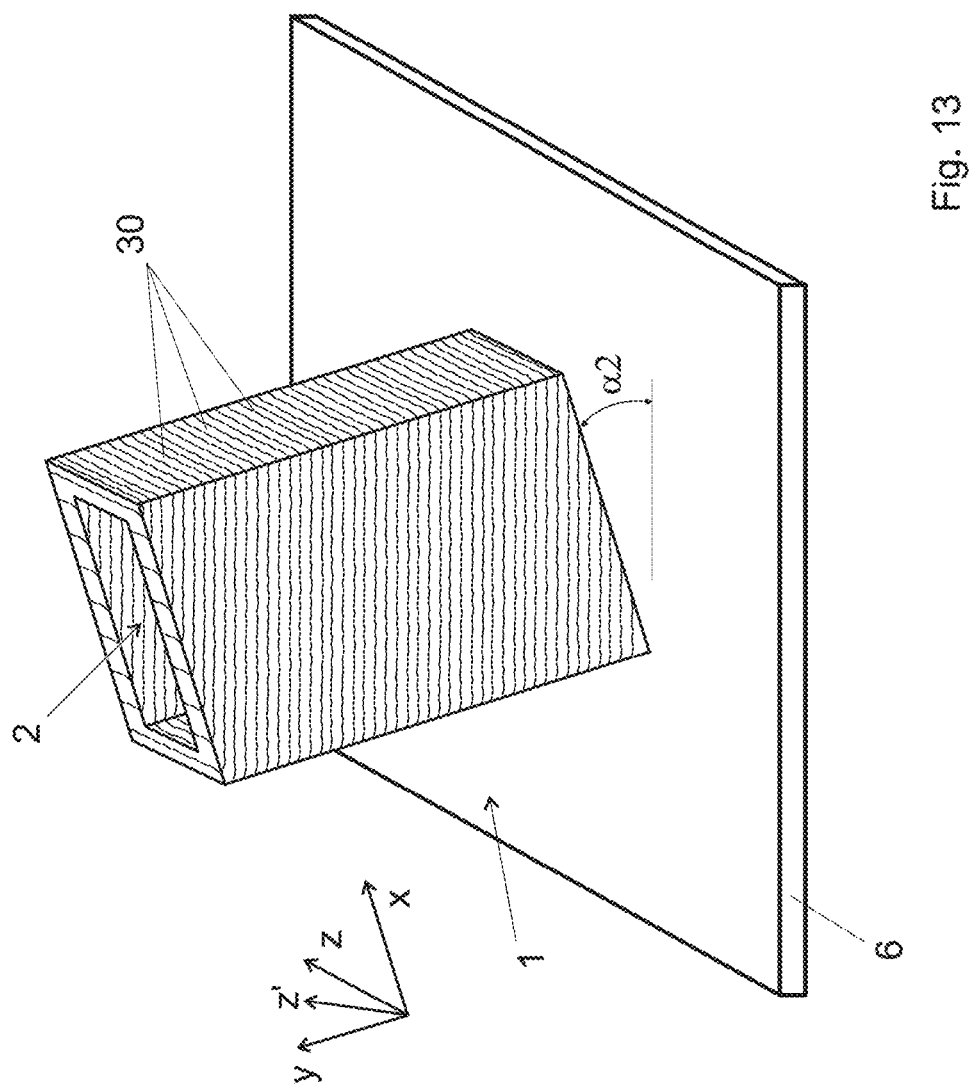
FIG. 13 schematically illustrates the 3D printing of a waveguide with a rectangular cross-section, the printing being performed in a near vertical position but with printing planes oblique to some sides of the cross-section, resulting in problematic cantilevered sections.

FIG. 11 shows the signal attenuation per linear meter as a function of frequency for a rectangular waveguide channel with an a/b ratio of 2 (upper curve) and with a waveguide channel as described and an a/b ratio of 2.2. As can be seen from these measurement results, the losses caused by transmission in an oval waveguide channel as described are therefore lower than the signal losses in a conventional waveguide channel, provided that the ratio of maximum length a to maximum width b is changed to, for example, 2.2.

As an example, in an embodiment, the waveguide device is suitable for transmitting signals in a frequency range between 26.5 and 40 GHz. The dimension b may be 3.556 mm, and the dimension a may be 7.823 mm. The radius of curvature r of the curved ends is therefore b/2=1.778 mm.

Figure 15:
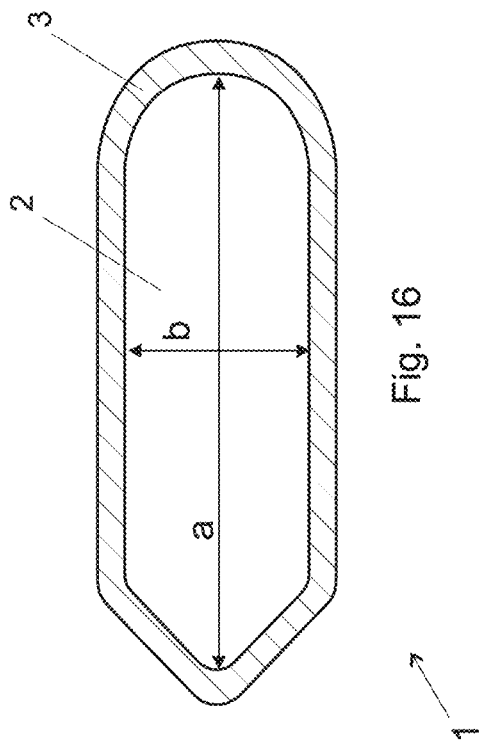
FIG. 15 illustrates a waveguide cross-section comprising two rectilinear sides connected to each other by two half-portions each formed of at least two straight line segments according to an embodiment.

In the embodiment shown in FIG. 15, the waveguide cross-section has two straight sides joined together by two half-portions formed by N line segments, where N is greater than or equal to 2. In this example, each half-portion is formed by 2 straight segments. Half portions formed by 3, 4 5 or 6 straight segments, for example, can also be made. The length of the segments is preferably equal and the angles between segments equal, in order to best approximate the semicircle shape.

Figure 16:
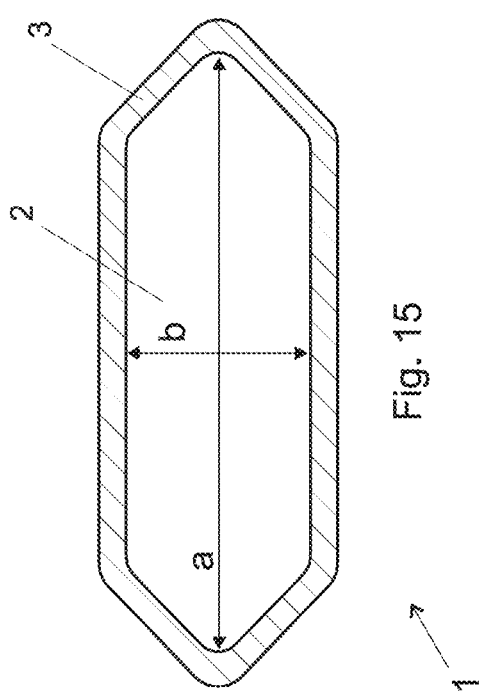
FIG. 16 illustrates a waveguide cross-section having two rectilinear sides connected together by one arcuate half-portion and another half-portion formed of at least two straight segments, according to an embodiment.

In the embodiment shown in FIG. 16, the waveguide cross-section comprises two straight sides connected to each other by an arcuate half-portion and another half-portion formed, as in the example above, of N straight line segments.

Figure 17:
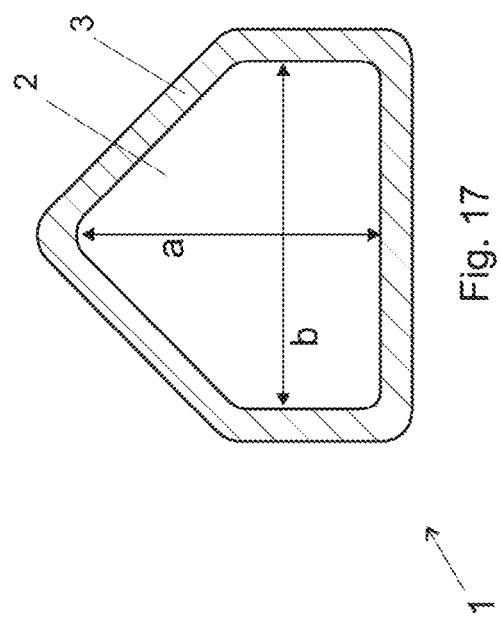
FIG. 17 illustrates a waveguide cross-section having two straight sides connected together by a half-portion formed of at least two straight segments and another straight half-portion according to an embodiment.

In the embodiment shown in FIG. 17, the waveguide cross-section comprises two straight sides connected to each other by a straight half portion and another half portion formed, as in the example above, of N straight segments.

As illustrated in FIG. 3, the inner surface 7 of the channel may be provided with a ridge 20 on one of the long sides, in order to control the transmission modes. The height of this ridge may be variable. The ridge 20 may be straight, as shown, or twisted. The inner surface may also have a septum not shown.

As shown in FIG. 4, the inner surface 7 of the channel may be provided with multiple ridges 20, such as two ridges facing each other on opposite long sides, to control transmission modes. Waveguides with three ridges at 120° from each other, or four ridges at 90° from each other, can also be made.

Figure 5:
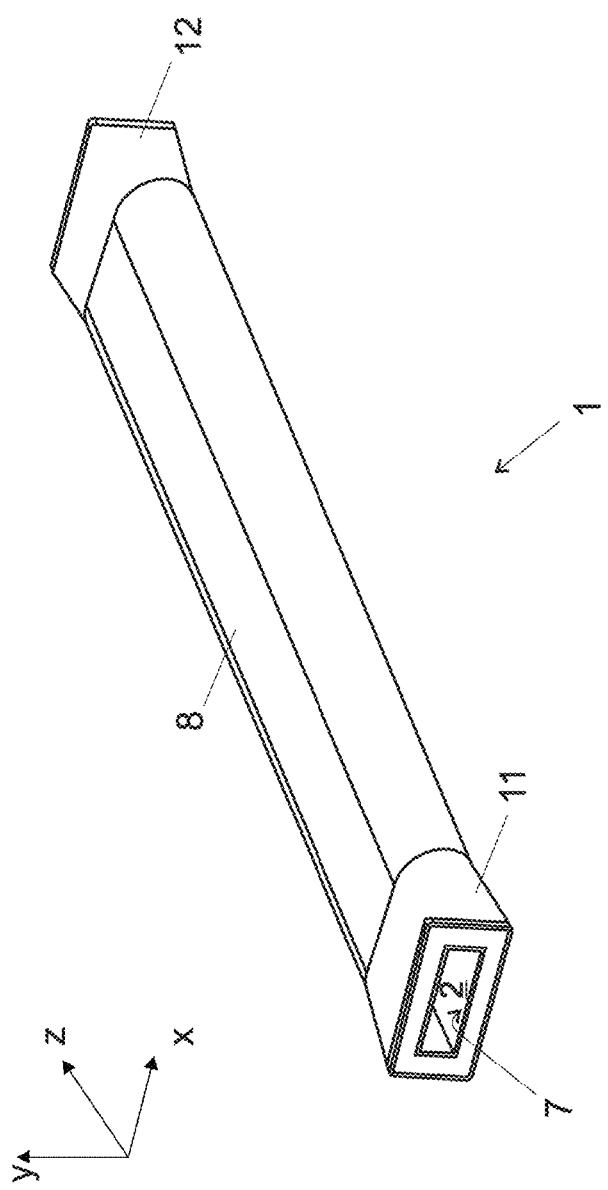
FIG. 5 illustrates a waveguide portion of oval cross-section whose ends progressively evolve to a rectangular cross-section.

As illustrated in FIG. 5, the cross-sectional shape of the channel 2 can change gradually from, for example, an oval shape as described above in the middle of the waveguide, to a rectangular shape at one or both ends 11,12 of the waveguide 1. The transition can be made over a small portion of the length of the device, for example, a portion less than 10 mm, for example, a 5 mm portion. This change in shape allows for a device with an oval cross-section along most of its length, with the advantages described above, but which can be connected directly to waveguides or equipment with a rectangular cross-sectional waveguide channel. The transition may also include a change in the ratio of the maximum length a to the maximum width b of the channel 2, so as to change, for example, from a ratio of between 2.05 and 2.4 for the intermediate oval portion to a ratio of 2 at the end(s).

In an embodiment not shown, the cross-section of the channel 2 retains its shape or type of shape along its entire length, however, the proportions between the length a and width b of the channel are gradually changed.

As illustrated in FIG. 6, the waveguide 1 may be twisted. For this purpose, the cross-section of the channel 2 undergoes a progressive rotation along the longitudinal direction of the guide, for example, a rotation about the longitudinal axis z. In FIG. 6, the rotation between the two ends of the waveguide is 90° so that the longest length a of the channel 2 that is in a horizontal plane at one end of the waveguide is in a vertical plane at the other end.

Progressive rotation of the waveguide cross-section about the x-axis and/or the y-axis may also be achieved.

As illustrated in FIG. 7, the waveguide 1 may also be twisted by progressive rotation of the cross-section simultaneously about the longitudinal (z) axis and at least one other axis of the device, in this case the y axis.

As illustrated in FIG. 8, the waveguide 1 can also be curved and thus change its longitudinal direction, through progressive rotation of said cross section about the transverse axis (x) of the device. This rotation can occur over a limited portion of the length of the waveguide, which thus comprises as in the example successively a straight portion, a curved portion and a second straight portion. The waveguide device may be curved about the longitudinal z axis of the channel.

FIG. 10 illustrates a waveguide device with an oval cross-section, having two straight end portions and a central portion 10 twisted through 90° so that one end of the device is rotated, for example through 90°, relative to the opposite end.

Figure 14:
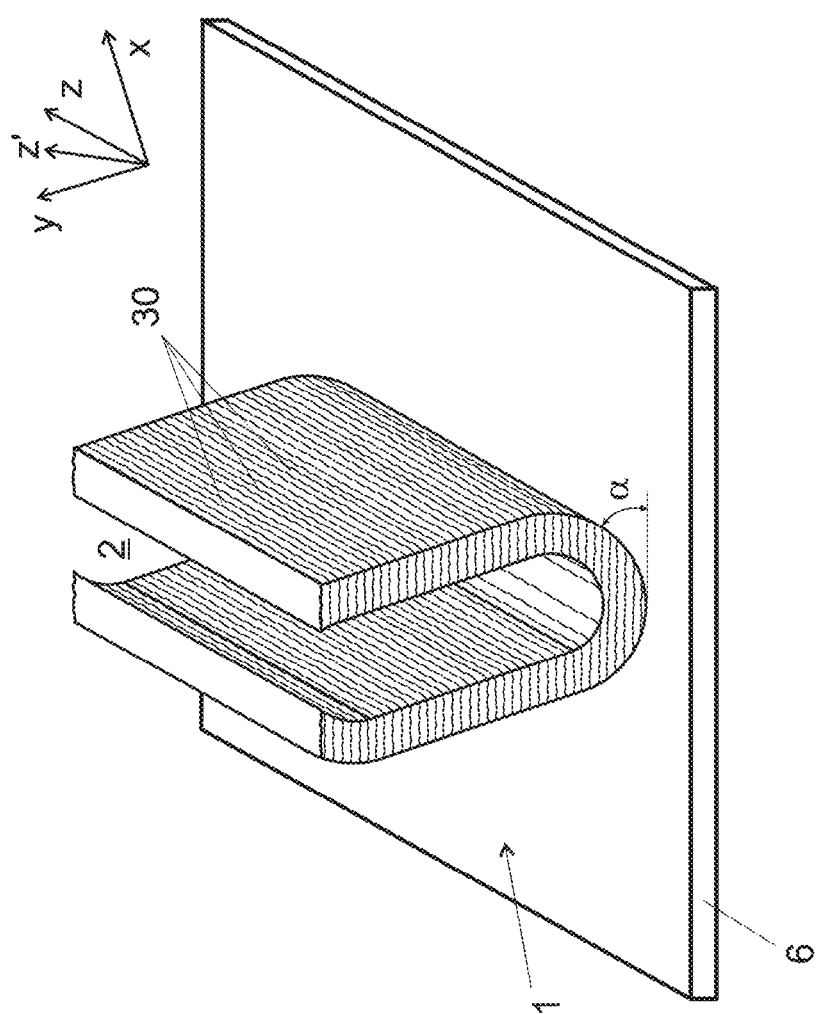
FIG. 14 schematically illustrates the 3D printing of a rectangular cross-section waveguide according to the invention, the printing being performed with printing planes oblique to some sides of the cross-section, resulting in problematic cantilevered sections.

As mentioned, the core 3 of the device is made by 3D printing, for example by stereolithography or by deposition or hardening of successive layers. As illustrated schematically in FIG. 14 showing a waveguide being printed, printing waveguide devices with complex shapes, for example curved, twisted devices, having bifurcations or changes in the cross-section of the guide channel, may imply that on at least some cross-sections the printing layers are not parallel to the printing plate, i.e., horizontal. The vaulted shape of the short sides of the channel 2, however, makes it possible to limit the length of the cantilevered portions, and thus to reduce the risk and/or the amplitude of the collapse of these portions before being hardened. This vaulted shape is also inherently stronger and more rigid than a lintel shape as in a rectangular cross-section waveguide, so that the channel geometry is better preserved before and after hardening of the printing layers. It can also be seen in this figure that the rectilinear shape of the long sides makes it easier to print the layers that make up the long sides, especially if the printing is done with the long sides rectilinear and extending vertically or substantially vertically.

The rectilinear surfaces of the waveguide device are preferably oriented vertically, or at least at an angle greater than 20°, preferably greater than 40°, to avoid the risk of deformation of these surfaces.

The term "oval-shaped" in this description and in the claims does not exclude substantially oval shapes as defined above, but including one or more ridges or septums, or one or more holes. Nor does the term "straight" exclude the presence of a ridge, septum or hole.

REFERENCE NUMBERS USED ON FIGURES

1 Waveguide device
2 Channel (waveguide opening)
20 Ridge
3 3D printed core
4 Internal metal coating
5 External metal coating
6 Printing platform
7 Inner surface
8 Outer surface
10 Intermediate portion of a waveguide device
11 End portion 1
12 End portion 2
a Longest length of the channel
b Width of the channel, in a direction perpendicular to a
x,y x,y Orthogonal axes in the plane of the channel cross section
z Longitudinal axis of the channel
z1 Axis perpendicular to the deposition layers during 3D printing of the core α Angle between a surface of the device and the printing platform.

What is claimed is:

1. Waveguide device for guiding a radio frequency signal at a given frequency f, the device comprising:
    a core manufactured by additive manufacturing and comprising side walls with inner and outer surfaces, the inner surfaces delimiting a waveguide channel,
    wherein a cross-section of the channel has two straight sides joined together by two half-portions, at least one of the two half-portions being rounded or formed of at least two straight segments
    said cross-section having a maximum length and a maximum width, the ratio between the maximum length and the maximum width being between 2.05 and 3.5.

2. The device of claim 1, said cross-section of the channel being oval cross-section.

3. The device of claim 2, said cross-section of the channel progressively evolving from the middle of the device from said oval cross-section to a rectangular cross-section at one end of the device.

4. The device of claim 1, the two half portions being rounded.

5. The device of claim 4, said rounded half portions forming semicircles.

6. The device of claim 1, to wherein the inner surface of the channel is provided with at least one ridge.

7. The device of claim 1, the inner surface of the channel being provided with two ridges on said long straight sides, the two ridges facing each other.

8. The device of claim 7, being twisted by progressive rotation of said cross-section simultaneously about the longitudinal axis and at least one other axis of the device.

9. The device of claim 1, being twisted by progressive rotation of said cross-section along at least a portion of the device.

10. The device of claim 9, being twisted by progressive rotation of said cross-section about the longitudinal axis of the device.

11. The device of claim 1, being curved by rotation of said cross-section progressively along at least a portion of the device about the transverse axis of the device parallel to a said straight side.

12. The device of claim 1, being curved by rotation of said cross-section progressively along at least a portion of the device about the transverse axis of the device perpendicular to a said straight side.

13. The device of claim 1, comprising a conductive layer covering said core, said conductive layer being formed of a metal.

14. A method of manufacturing a waveguide device of claim 1, comprising a step of additive manufacturing of said core,
    wherein said additive manufacturing is obtained by adding successive layers parallel to each other, said layers being non-parallel to said straight sides.

15. The method of claim 14, said layers being oblique to said straight sides.

16. The method of claim 15, wherein the angle between said layers and said straight sides is greater than 20°.

17. The method of claim 15, wherein the angle between said layers and said straight sides is greater than 40°.

18. The device of claim 1, wherein the ratio between the maximum length and the maximum width being between 2.05 and 2.4.

* * * * *